United States Patent
Li et al.

(10) Patent No.: US 12,505,467 B2
(45) Date of Patent: Dec. 23, 2025

(54) PREDICTING A CONVERSION RATE

(71) Applicant: Snap Inc., Santa Monica, CA (US)

(72) Inventors: Weizhi Li, Freemont, CA (US); Vineet Abhishek, San Mateo, CA (US); Jason Brewer, Mountain View, CA (US); Roman Grachev, Burlingame, CA (US); Yuqi Deng, Bellevue, WA (US); David B. Lue, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/315,288

(22) Filed: May 10, 2023

(65) Prior Publication Data

US 2024/0378638 A1    Nov. 14, 2024

(51) Int. Cl.
- *G06Q 30/00* (2023.01)
- *G06Q 30/0241* (2023.01)
- *G06Q 30/0242* (2023.01)
- *G06Q 30/0273* (2023.01)

(52) U.S. Cl.
CPC ..... *G06Q 30/0246* (2013.01); *G06Q 30/0275* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 10,915,929 B1 * | 2/2021 | Huang | H04N 21/4758 |
| 11,341,518 B1 * | 5/2022 | McCurdy | G06F 18/2155 |
| 2011/0040616 A1 * | 2/2011 | Kannan | G06Q 30/0246 |
| | | | 707/E17.014 |
| 2016/0292722 A1 * | 10/2016 | Myers | G06Q 30/0243 |
| 2021/0004437 A1 * | 1/2021 | Zhang | G06F 40/205 |

(Continued)

FOREIGN PATENT DOCUMENTS

CN    113139825 A  *  7/2021  ......... G06F 21/6218

OTHER PUBLICATIONS

Matos, Luís Miguel, et al. "Using deep learning for mobile marketing user conversion prediction." 2019 International Joint Conference on Neural Networks (IJCNN). IEEE, 2019. (Year: 2019).*

(Continued)

*Primary Examiner* — Michael Bekerman
(74) *Attorney, Agent, or Firm* — Schwegman Lundberg & Woessner, P.A.

(57) ABSTRACT

Aspects of the present disclosure involve a system comprising a storage medium storing a program and method for predicting a conversion rate. The program and method provide for receiving, from an advertisement service, a bid to display a first advertisement at a computing device; determining, in response to receiving the bid, a set of features that relate to the first advertisement; providing the set of features to a machine learning model configured to output a predicted conversion rate for the first advertisement, the machine learning model having been trained based on multi-task learning using plural sets of features corresponding to plural second advertisements, the plural sets of features being associated with both click-through conversions and view-through conversions; and determining, based on the output of the machine learning model with respect to the set of features, the predicted conversion rate for the first advertisement.

20 Claims, 9 Drawing Sheets

(56) References Cited

U.S. PATENT DOCUMENTS

2021/0110417 A1* 4/2021 Lade .................. G06Q 20/3278
2022/0245670 A1* 8/2022 Cao .......................... G06N 3/04
2024/0143416 A1* 5/2024 Rogers .................. G06N 20/00
2025/0095025 A1* 3/2025 Shtoff ................ G06Q 30/0275

OTHER PUBLICATIONS

Yao, Zijun, et al. "Multi-view multi-task campaign embedding for cold-start conversion rate forecasting." IEEE Transactions on Big Data 9.1 (2022): 280-293. (Year: 2022).*

Shi, Xiujin, et al. "A Novel Click-Through Rate Prediction Model Based on Deep Feature Fusion Network." AATCC Journal of Research (2023): 24723444221147967. (Year: 2023).*

Zhang, Wenhao, et al. "Large-scale causal approaches to debiasing post-click conversion rate estimation with multi-task learning." Proceedings of The Web Conference 2020. 2020. (Year: 2020).*

Wang, Ruoxi, et al. "Deep & cross network for ad click predictions." Proceedings of the ADKDD'17. 2017. 1-7. (Year: 2017).*

Dai, Quanyu, et al. "A generalized doubly robust learning framework for debiasing post-click conversion rate prediction." Proceedings of the 28th ACM SIGKDD Conference on Knowledge Discovery and Data Mining. 2022. (Year: 2022).*

Luo, Hongxin, et al. "Multi-Task Deep Learning with Task Attention for Post-Click Conversion Rate Prediction." Intelligent Automation & Soft Computing 36.3 (2023). (Year: 2023).*

Xi, Dongbo, et al. "Modeling the sequential dependence among audience multi-step conversions with multi-task learning in targeted display advertising." Proceedings of the 27th ACM SIGKDD Conference on Knowledge Discovery & Data Mining. 2021. (Year: 2021).*

Guo, Siyuan, et al. "Enhanced doubly robust learning for debiasing post-click conversion rate estimation." Proceedings of the 44th International ACM SIGIR Conference on Research and Development in Information Retrieval. 2021. (Year: 2021).*

Tang, Hongyan, "Progressive Layered Extraction (PLE): A Novel Multi-Task Learning (MTL) Model for Personalized Recommendations", RecSys '20: Fourteenth ACM Conference on Recommender Systems, (Sep. 2020), 269-278.

Wang, Hao, et al., "ESCM2: Entire Space Counterfactual Multi-Task Model for Post-Click Conversion Rate Estimation", arXiv:2204.05125v2 [cs.AI], (May 23, 2022), 3 pgs.

Wang, Ruoxi, et al., "DCN V2: Improved Deep & Cross Network and Practical Lessons forWeb-scale Learning to Rank Systems", arXiv:2008.13535v2 [cs.IR], (Oct. 20, 2020), 14 pgs.

Zhang, Wenhao, et al., "Large-scale Causal Approaches to Debiasing Post-click Conversion Rate Estimation with Multi-task Learning", p. 2775-2781.

"International Application Serial No. PCT/US2024/028575, International Search Report mailed Jul. 17, 2024", 3 pgs.

"International Application Serial No. PCT/US2024/028575, Written Opinion mailed Jul. 17, 2024", 6 pgs.

Hongxia, Yang, et al., "Local Algorithm for User Action Prediction Towards Display Ads", Proceedings of the 2nd ACM International Workshop on Distributed Machine Learning, ACMPUB27, New York, NY, USA, (Aug. 13, 2017), 9 pgs.

Siyuan, Guo, et al., "Enhanced Doubly Robust Learning for Debiasing Post-click Conversion Rate Estimation", arxiv.org, Cornell University Library, 201 Olin Library Cornell University Ithaca, NY 14853, (Jan. 9, 2022), 10 pgs.

* cited by examiner

PREDICTING A CONVERSION RATE

TECHNICAL FIELD

The present disclosure relates generally to resource allocation, including allocating resources based on predicting a conversion rate.

BACKGROUND

Advertising in a digital world includes transmission of different kinds of advertising media to remote locations and to various devices. Selecting advertisements to be transmitted to such a wide variety of devices at various locations can be difficult.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Advertising in a digital world includes transmission of different kinds of advertising media to remote locations and to various devices. Selecting advertisements to be transmitted to such a wide variety of devices at various locations can be difficult.

The disclosed embodiments provide for an advertising system configured to predict conversion rates for advertisements. The advertising system receives multiple bids from respective advertisement services to display an advertisement at an end user's computing device. For each bid, the advertising system determines features that relate to the respective advertisement. For example, the features relate to pixel events including pixel page view, pixel sign up, pixel add to cart and pixel purchase. The features can be associated with click-through conversions and/or view-through conversions.

For each bid, the advertising system provides the respective features to a machine learning model configured to predict loss with respect to a conversion rate. The machine learning model was trained, based on multi-task learning, on the above pixel events (e.g., pixel page view, pixel sign up, pixel add to cart and pixel purchase) and was further trained on corresponding click-through conversions and view-through conversions. Moreover, the advertising system is configured to determine the predicted conversion rate based on performing inverse propensity weighting (e.g., debiasing) with respect to input features. Based on the predicted conversion rates for each of the received bids, the advertising system is configured to select/recommend an advertisement to display on the end user's computing device.

Networked Computing Environment

Figure 1:
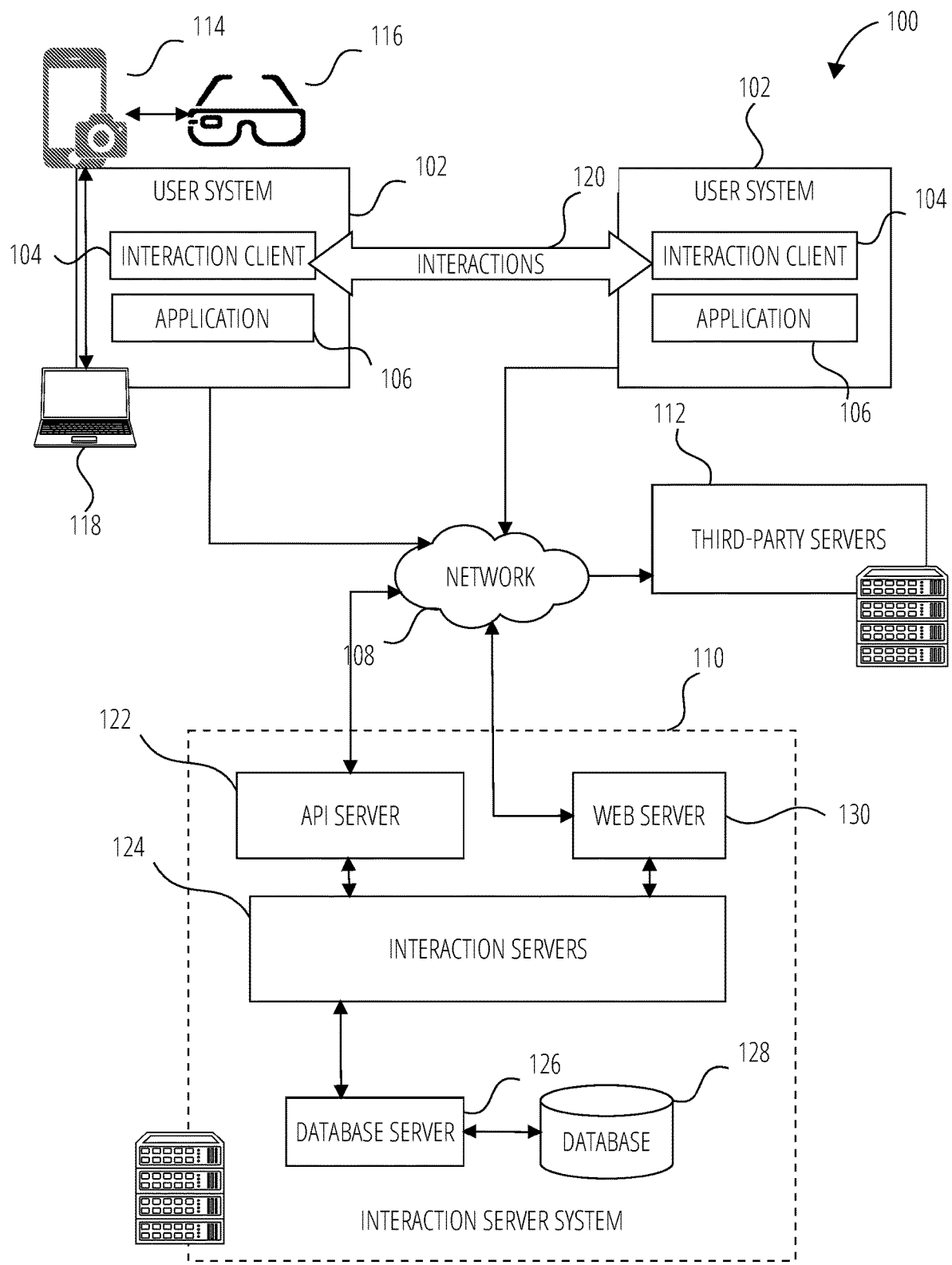
FIG. 1 is a diagrammatic representation of a networked environment in which the present disclosure may be deployed, according to some examples.

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a.*ml file), an applet may incorporate a scripting language (e.g., a.*js file or a .json file) and a style sheet (e.g., a.*ss file).

In response to receiving a user selection of the option to launch or access features of the external resource, the interaction client 104 determines whether the selected external resource is a web-based external resource or a locally installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally installed application 106, the interaction client 104 instructs the user system 102 to launch the external resource by executing locally stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
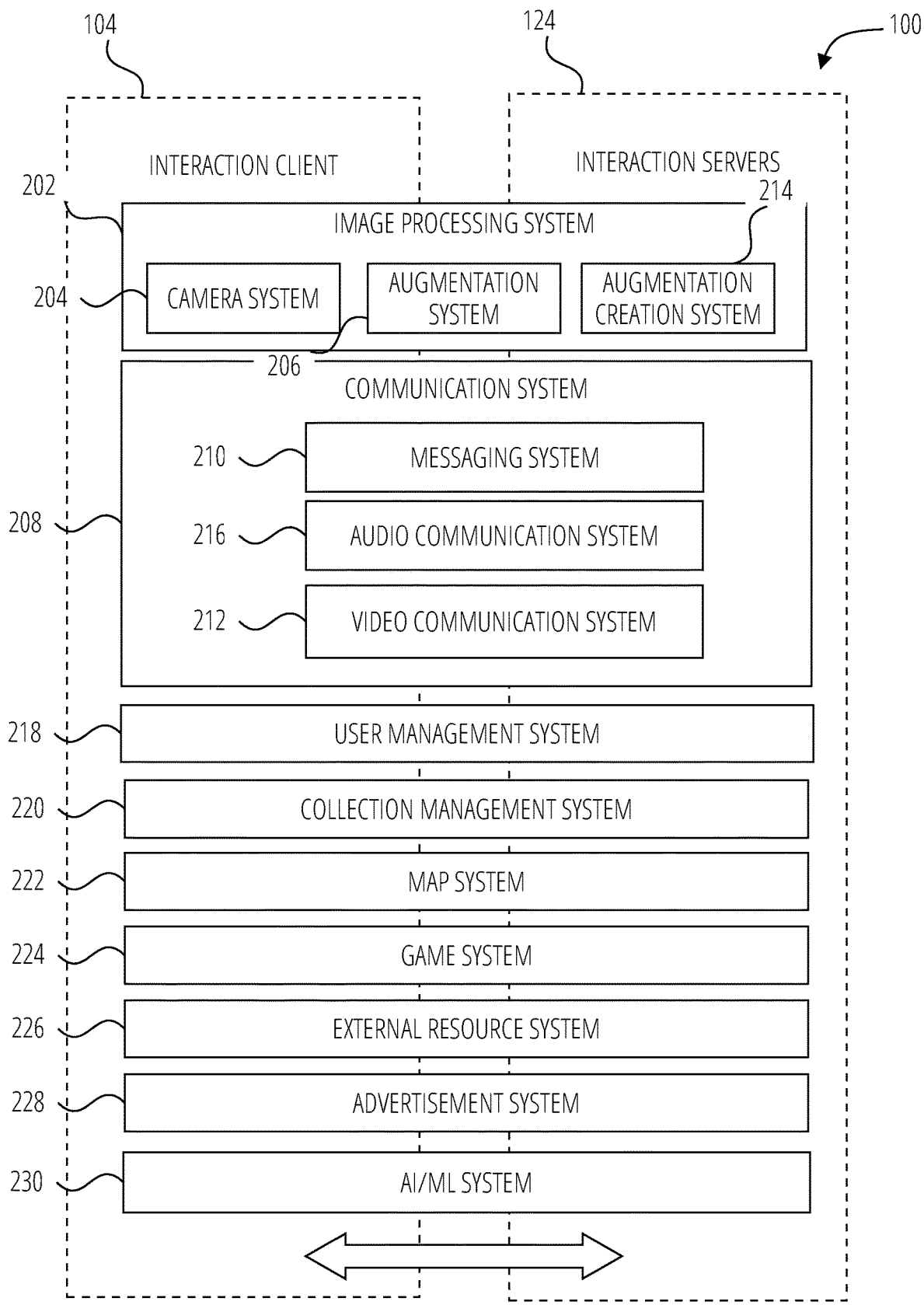
FIG. 2 is a diagrammatic representation of a messaging system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 502 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties (e.g., advertisement services) for presentation to end-users via the interaction clients 104 and also handles the delivery and presentation of these advertisements. In example embodiments, the advertisement system 228 is configured to submit an offer to display an advertisement to a user (e.g., running the interaction client 104) to one or more advertisement services. The advertisement system 228 is further configured to receive one or more advertising bids. For example, in response to transmitting the offer to an advertisement service, the advertisement system 228 receives one or more bids from the advertisement service. In example embodiments, the bids indicate an advertisement to be displayed in an advertising spot and a bid amount. The bid amount indicates an amount to be paid in response to the advertising being displayed to the user at the user system 102. In other embodiments, the bid amount is contingent upon the interacting with the advertisement or providing some input or response to the advertisement.

The advertisement system 228 is further configured to select one of the received bids in accordance with any of the ways described herein. In one example, the advertisement system 228 selects a bid by determining an estimated conversion rate for an advertisement indicated by a bid and multiplies that value by the bid amount for the bid. As described further below with respect to FIG. 5, the conversion rate is estimated using a model architecture implemented by the advertisement system 228. The advertisement system 228 is configured to determine an estimated profit for displaying the advertisement by multiplying a bid amount with the conversion rate. Moreover, the advertisement system 228 is configured to transmit the advertisement indicated with the selected bid to the user system 102.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the augmentation system 206 to generate augmented content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands.

Data Architecture

Figure 3:
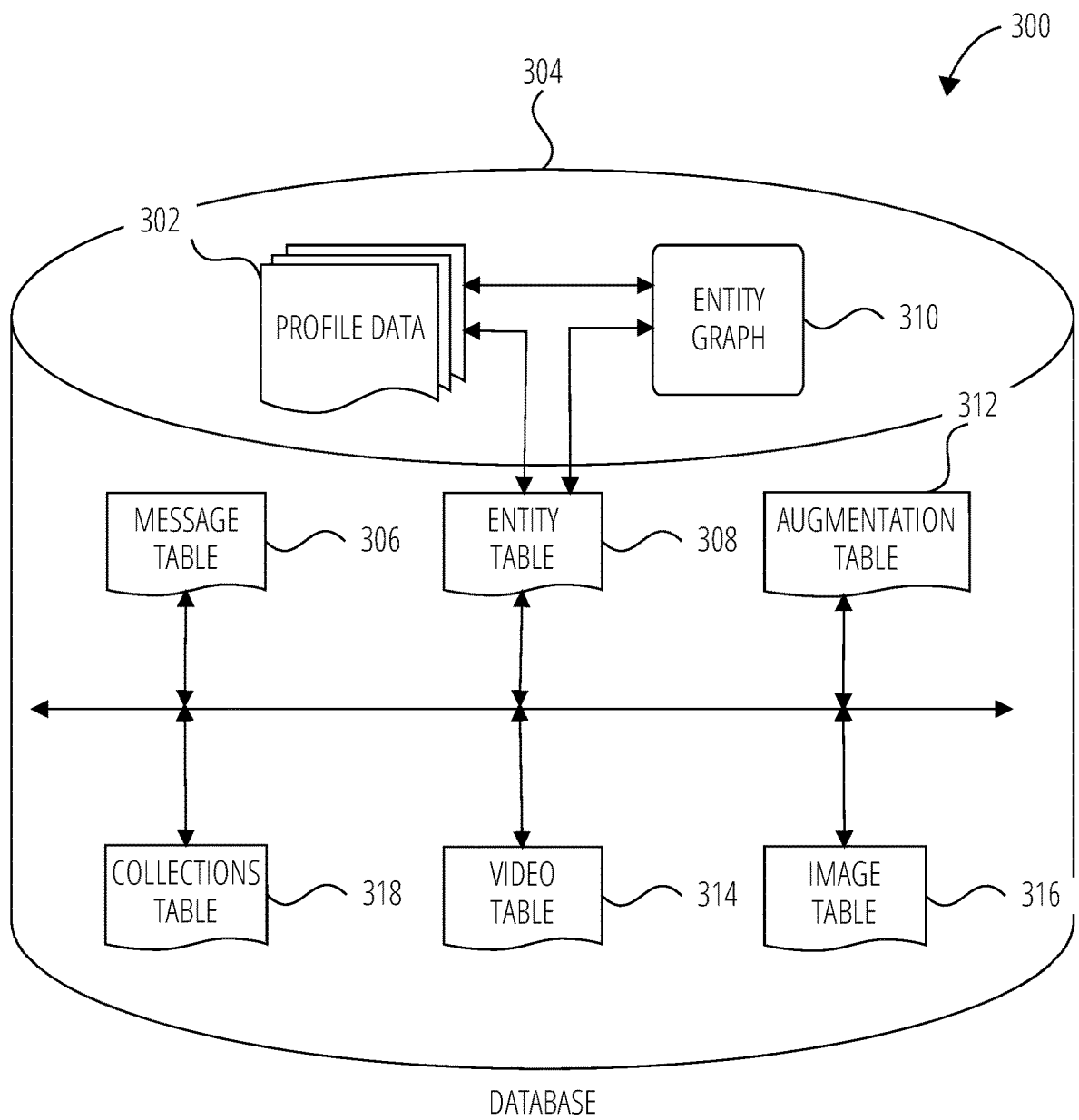
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

Data Communications Architecture

Figure 4:
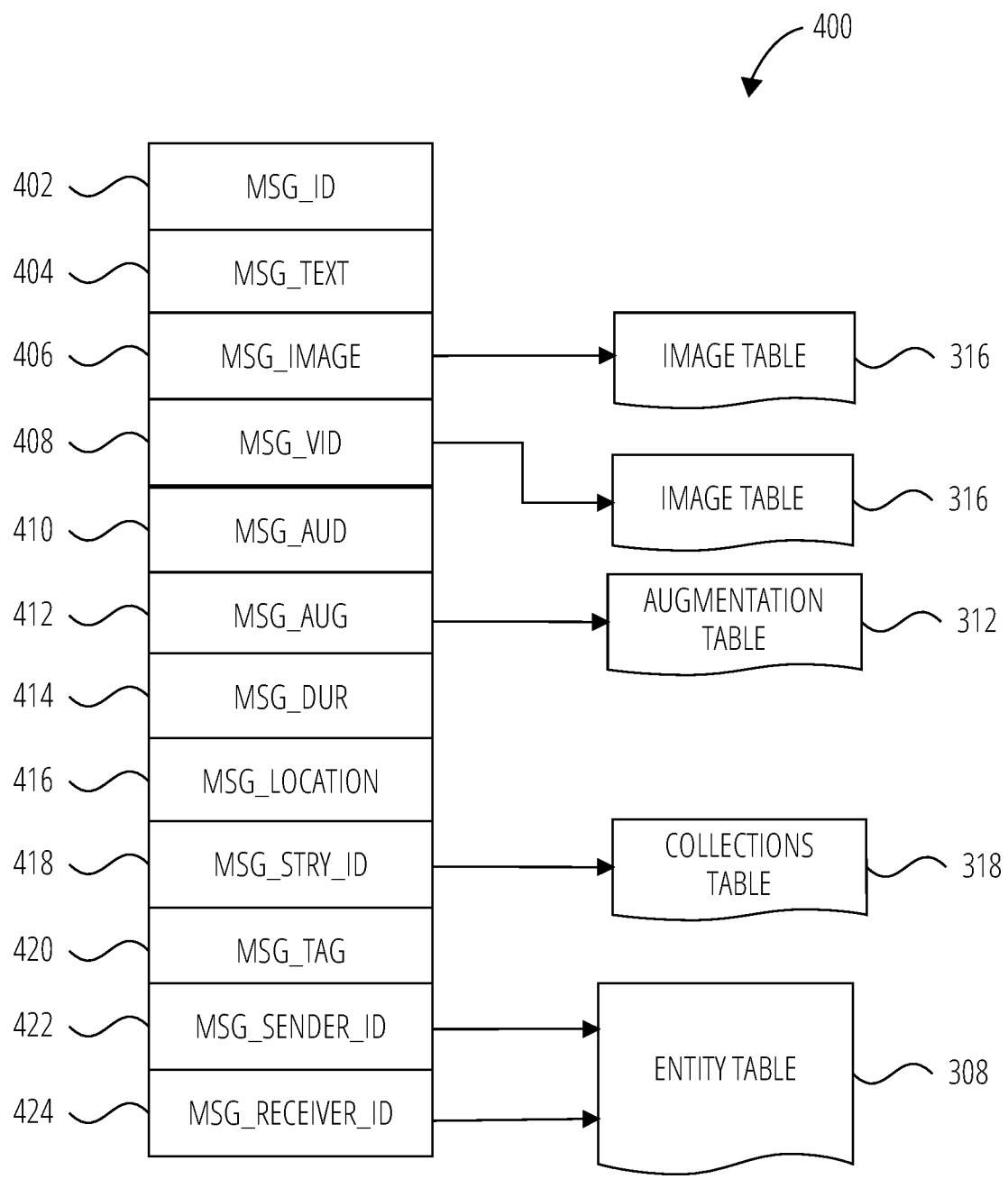
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

Message identifier 402: a unique identifier that identifies the message 400.

Message text payload 404: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 316.

Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the collections table 318) with which a particular content item in the message image payload 406 of the message 400 is associated. For example, multiple images within the message image payload 406 may each be associated with multiple content collections using identifier values Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a collections table 318, and values stored within the message sender identifier 422 and the message receiver identifier 424 may point to user records stored within an entity table 308.

Figure 5:
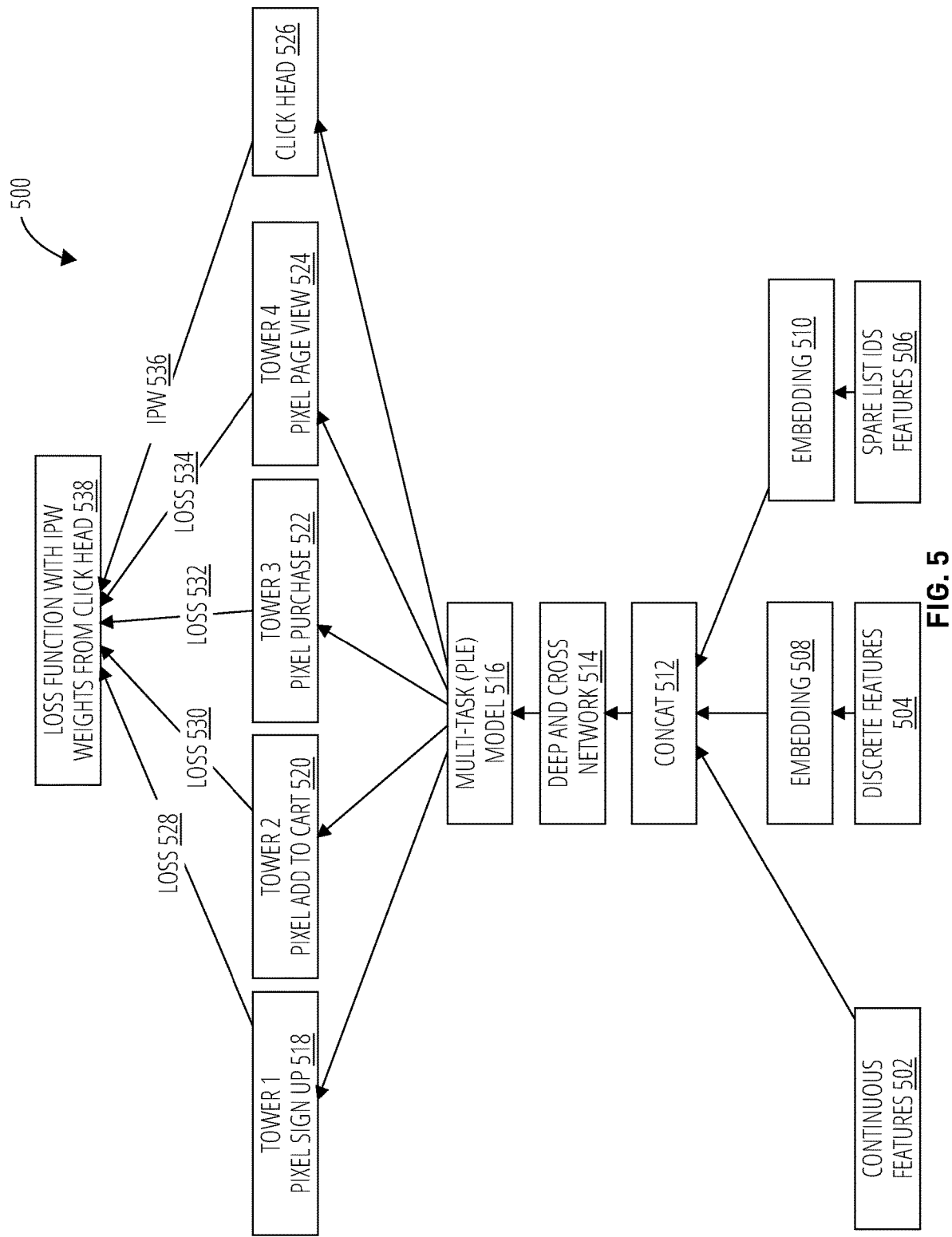
FIG. 5 is a block diagram showing an example model architecture for predicting a conversion rate, in accordance with some examples.

FIG. 5 is a block diagram showing an example model architecture 500 for predicting a conversion rate, in accordance with some examples. For explanatory purposes, the model architecture 500 is primarily described herein with reference to the user system 102 of FIG. 1 and the advertisement system 228 of FIG. 2. However, the model architecture 500 may correspond to one or more other components and/or other suitable devices.

As noted above, the advertisement system 228 is configured to submit an offer to display an advertisement at a computing device (e.g., the user system 102). The advertisement system 228 is configured to receive advertising bids from one or more advertisement services (e.g., advertising servers), where each bid indicates a corresponding advertisement and includes a corresponding bid amount. As described herein, the advertisement system 228 is configured to compute conversion rates via the model architecture 500. The advertisement system 228 is configured to select an advertising bid based on the computed conversion rates, and to cause the advertisement corresponding to the selected advertising bid to be displayed on the user system 102.

In example embodiments, the advertisement system 228 is configured to detect different user behaviors in order to estimate conversion rates. Examples of such behaviors include, but are not limited to video view time, click, app install, purchase, and the like. For example, based on view and click, users tend to perform other actions, including but not limited to click to sign up, add to cart or purchase.

A third-party advertisement platform may only consider click-through conversions (CTCs), corresponding to last touch or last click in order to attribute a conversion. However, as described herein, the advertisement system 228 of the interaction system 100 (e.g., corresponding to a first-party platform) is further configured to use view-through conversions (VTCs) in order to increase user conversions and to report these additional conversions to advertisers. To further reduce serving cost, and to build a single model to capture these different user behaviors, the advertisement system 228 implements a multi-task learning (MTL) model as part of its recommendation system for advertisements.

As shown the example of FIG. 5, the model architecture 500 includes features 502-506, embeddings 508-510, a concatenation 512, a deep and cross network 514, a multi-task (PLE) model 516, towers 518-524, a click head 526 and a loss function 538. Regarding the features 502-506, the continuous features 502 correspond to features that are continuous and assume a number (e.g., an infinite number)

of values within a given range. On the other hand, the discrete features 504 correspond to features that are discrete and assume a countable number of values (e.g., country identifier, brand identifier, and the like). Moreover, the spare list ids features 506 correspond features that are discrete and assume a finite number of values (e.g., 7-day swipe identifier indicating that the user has 7 days to swipe the advertisement, 7-day advertisement impressions, advertisement identifiers, and the like).

In example embodiments, the features 502-506 include click-through conversions (CTCs) and view-through conversions (VTCs). As described herein, a CTC is counted when a user clicks an advertisement and then converts as a direct result. On the other hand, a VTC is counted when a user is shown an advertisement and does not click, but converts later.

As shown in the example of FIG. 5, an embedding 508 is performed with respect to the discrete features 504, and an embedding 510 is performed with respect to the spare list ids features 506. For example, the embedding 508 is configured to receive the discrete features 504 as input, which in example embodiments provides for projecting the discrete features 504 from a high-dimensional sparse space to a lower-dimensional dense space. In another example, the embedding 510 is configured to receive the spare list ids features 506 as input, which in example embodiments provides for projecting the spare list ids features 506 from a high-dimensional sparse space to a lower-dimensional dense space.

As shown in the example of FIG. 5, the embeddings 508-510 are concatenated together with the continuous features 502 via the concatenation 512. For example, the concatenation 512 creates a single vector-valued column from the multiple columns corresponding to the embedding 508 (e.g., the embedded discrete features 504), the embedding 510 (e.g., the embedded spare list ids features 506) and the continuous features 502. Thus, the model architecture 500 provides for integrating VTCs and CTCs with respect to features 502-506 (e.g., 7-day swipe identifier, 7-day advertisement impressions, advertisement identifiers, and the like), transforming the categorical features into embeddings 508-510, and performing concatenation 512 with continuous (numeric) features to generate a single-vector valued column.

In example embodiments, the single vector-valued column is provided as input to the deep and cross network 514. The deep and cross network 514 includes multiple cross layers configured to model explicit feature interactions corresponding to the concatenated features 502-506. The deep and cross network 514 also implements a deep network configured to model implicit feature interactions corresponding to the concatenated features 502-506. In example embodiments, the deep and cross network 514 corresponds to DCN-V2.

As shown in the example of FIG. 5, the output from the deep and cross network 514 is provided as input to the multi-task progressive layered extraction (PLE) model 516. In example embodiments, multi-task (PLE) model 516 implements or otherwise accesses the towers 518-524 and the click head 526. For example, each of the towers 518-524 corresponds to a tower network that is specific to a task. As shown in the example of FIG. 5, the tower 518 is task-specific to pixel sign up, the tower 520 is task-specific to pixel add to cart, the tower 522 is task-specific to pixel purchase, and the tower 524 is task-specific to pixel page view.

It is noted that negative transfer is a common phenomenon in multi-task learning (MTL), particularly for loosely-correlated tasks. For complex task correlation and sample dependent correlation patterns, a seesaw phenomenon may be observed, where improving shared learning efficiency and achieving significant improvement over the corresponding single-task model across all tasks is difficult for MTL models. The multi-task (PLE) model 516 is configured to address such seesaw phenomenon and negative transfer.

While not shown in the example of FIG. 5, the multi-task (PLE) model 516 implements a customized gate control (CGC) model that separates shared and task-specific experts via expert modules. For example, the expert modules may be positioned as a separate layer in between the deep and cross network 514 and the towers 518-524. In example embodiments, an expert module is composed of multiple sub-networks (or "experts"), with the number of experts in each module being a hyperparameter to tune. Each of the tower networks (towers 518-524) is also a multi-layer network with width and depth as hyper-parameters.

In example embodiments, the experts include shared experts that are responsible for learning shared patterns. In addition, the experts include task-specific experts for extracting patterns for specific tasks. Each tower network (each of the towers 518-524) is configured to absorb knowledge from both shared experts and its own task-specific experts. As such, the parameters of shared experts are affected by all tasks while parameters of task-specific experts are only affected by the corresponding specific task. With respect to the CGC model implemented by the multi-task (PLE) model 516, the shared experts and task-specific experts are combined through a gating network for selective fusion.

It is possible for a CGC model to separate task-specific and shared components explicitly. The model architecture 500 provides for extending CGC to the the multi-task (PLE) model 516, which is more generalized and includes multi-level gating networks and progressive separation routing for more efficient information sharing and joint learning. In other words, parameters of different tasks in PLE are not fully separated in the early layer as CGC but are separated progressively in upper layers. The gating networks in higher-level extraction are configured to take the fusion results of gates in lower-level extraction as the selector instead of the raw input, as this may provide better information for selecting abstract knowledge extracted in higher-level experts.

The multi-task (PLE) model 516 further provides for optimizing the loss function to better handle the practical challenges of joint training for MTL models. As shown in the example of FIG. 5, the model architecture 500 associates the tower 518 with loss 528, the tower 520 with 530, the tower 522 with loss 532 and the tower 524 with loss 534.

Moreover, the model architecture 500 is configured to account for loss based on inverse propensity weighting (IPW 536) in association with the click head 526. As discussed further below with respect to FIGS. 6A-6B, the click head 526 is configured to remove or otherwise reduce click causality (or "Z") associated with the multi-task learning corresponding to losses 528-534. The losses 528-534 and IPW 536 are provided as input to the loss function 538, which is configured to determine the loss function associated with predicting a conversion rate as described herein.

Thus, the model architecture 500 provides for debiasing post-click conversion rate estimation. As noted above, the model architecture 500 integrates VTC and CTC into all training data. In addition, the model architecture 500 integrates multi-task concepts into a single de-bias model. By sharing, embedding and integrating the multi-task model (e.g., the multi-task (PLE) model 516), it is possible to boost model performance and prevent or otherwise reduce negative transfer to different tasks.

In example embodiments, model loss for a regular model (e.g., without applying the adjust weight to CTC) is calculated as follows:

$$\text{sum(loss)} = \text{loss}(ctc \text{ or } vtc)*1 + \text{loss(negative)}*1 \quad \text{(Equation 1)}$$

However, after applying the adjust weight to CTC, loss is calculated as:

$$\text{sum(loss)} = \text{loss}(ctc=1)*1/p\_\text{swipe} + \text{loss}(vtc)*1 + \text{loss(negative)}*1 \quad \text{(Equation 2)}$$

With respect to Equation (2) and the swipe task, based on the high variance inverse 1/p_swipe head, it is possible to add a clip value for the multi-task (PLE) model 516. In addition, a weight (e.g., 10%) may be applied weight loss for swipe head. In this regard, the swipe task may be considered as an auxiliary task which is not used to train the click-through-rate model.

Thus, the model architecture 500 in conjunction with the advertisement system 228 provides for improved conversion rate estimation. Compared to third-party advertisement platforms, the first-party platform corresponding to the advertisement system 228 provides for an increased number of deep actions (conversions) while maintaining accuracy. The advertisement system 228 provides for improved model performance, accurate CTCs when compared to third-party advertisement platforms, and maintaining view-through conversions. The increased number of conversions (e.g., with similar budget) may result in increased return on investment (ROI) for advertisers.

Figure 6B:
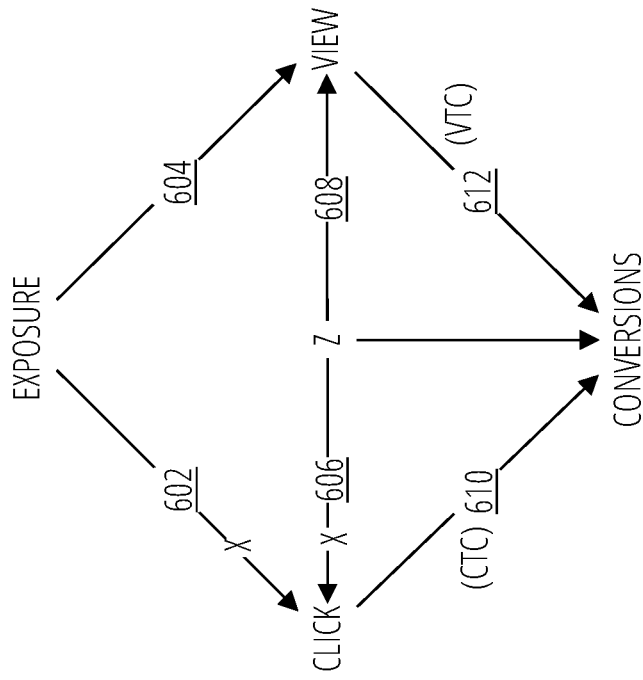
FIGS. 6A-6B illustrate view-through and click-through conversions with respect to different exposure, click, view and Z sequences, in accordance with some examples.
Figure 6A:
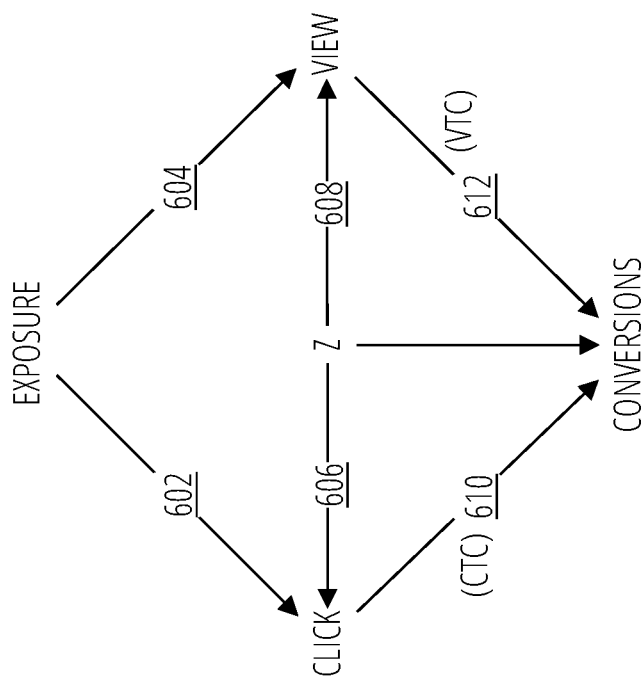

FIGS. 6A-6B illustrate view-through and click-through conversions with respect to different exposure, click, view and Z sequences, in accordance with some examples. The example of FIGS. 6A-6B illustrates an edge 602 for the exposure-click sequence, an edge 604 for the exposure-view sequence, an edge 606 for the Z-click sequence, an edge 608 for the Z-view sequence, an edge 610 for the click-conversion sequence, and an edge 612 for the view-conversion sequence. Moreover, the edge 610 corresponds to a click-through conversion (CTC), and the edge 612 corresponds to a view-through conversion (VTC).

As noted above, Z is a causal cofounder that affects users with respect to both click and purchase. In other words, Z tends to cause bias with respect to inference. The model architecture 500 provides for removing Z, and exposure to click causality. In this manner, Z does not have control over user click behaviors. In other words, the selection bias is removed. As shown in FIG. 6B, the edge 602 and the edge 606 are removed (e.g., depicted by the "x").

Figure 7:
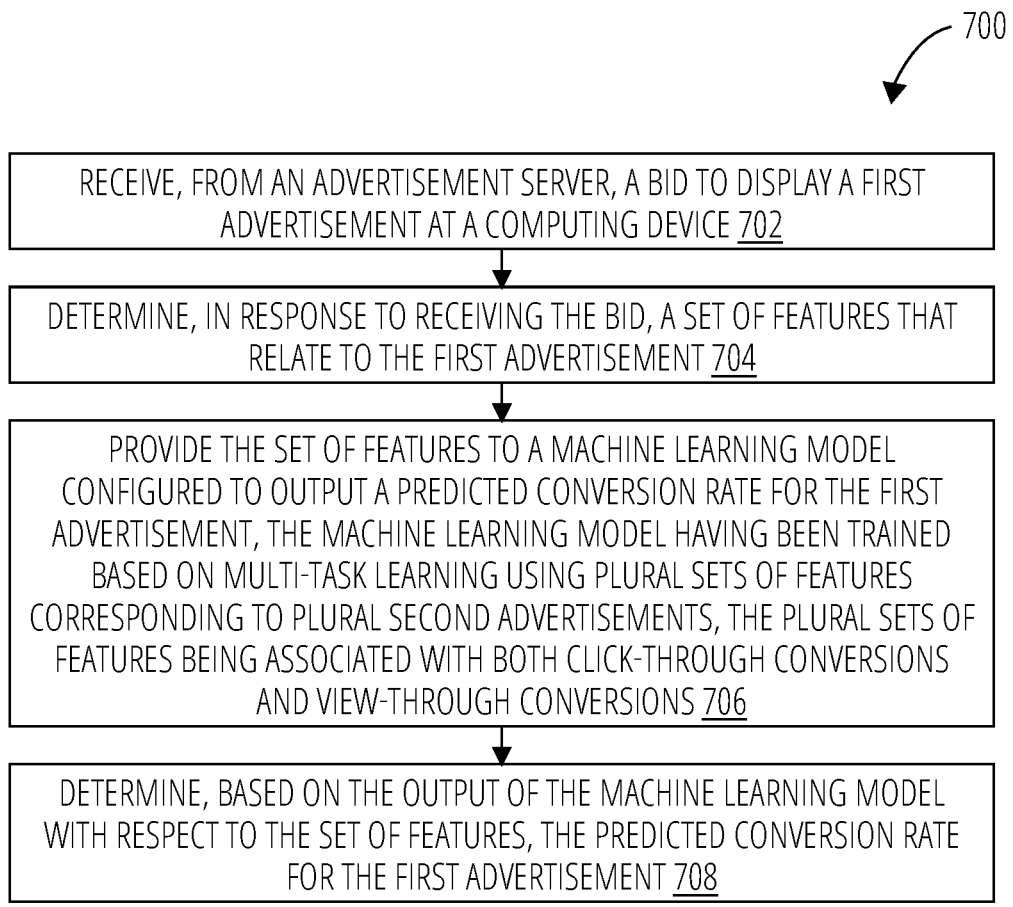
FIG. 7 is a flowchart illustrating a process 700 for predicting a conversion rate, in accordance with some examples.

FIG. 7 is a flowchart illustrating a process 700 for predicting a conversion rate, in accordance with some examples. For explanatory purposes, the process 700 is primarily described herein with reference to the advertisement system 228 of FIG. 2. However, one or more blocks (or operations) of the process 700 may be performed by one or more other components, and/or by other suitable devices. Further for explanatory purposes, the blocks (or operations) of the process 700 are described herein as occurring in serial, or linearly. However, multiple blocks (or operations) of the process 700 may occur in parallel or concurrently. In addition, the blocks (or operations) of the process 700 need not be performed in the order shown and/or one or more blocks (or operations) of the process 700 need not be performed and/or can be replaced by other operations. The process 700 may be terminated when its operations are completed. In addition, the process 700 may correspond to a method, a procedure, an algorithm, etc.

At block 702, the advertisement system 228 receives, from an advertisement service (e.g., a third-party advertising server), a bid to display a first advertisement at a computing device. The advertisement system 228 determines, in response to receiving the bid, a set of features that relate to the first advertisement (block 704).

The advertisement system 228 provides the set of features to a machine learning model configured to output a predicted conversion rate for the first advertisement (block 706). The machine learning model was trained based on multi-task learning using plural sets of features corresponding to plural second advertisements, the plural sets of features being associated with both click-through conversions and view-through conversions.

The multi-task learning is associated with tasks for pixel events. The pixel events include pixel page view, pixel sign up, pixel add to cart and pixel purchase. In example embodiments, the plural sets of features are further associated with advertisement impressions for a preset time period, swiped advertisement identifiers for the preset time period and other advertisement identifiers. The multi-task learning may correspond to a progressive layered extraction (PLE) model.

In example embodiments, the advertisement system 228 embeds a subset of the set of features that relate to the first advertisement, and concatenates, based on the embedding, the set of features for providing as input to the machine learning model. Moreover, the advertisement system 228 provides the concatenated set of features to a deep and cross network (e.g., DCN-V2). The deep and cross network includes multiple cross layers configured to model explicit feature interactions. The deep and cross network further includes a deep network configured to model implicit feature interactions. Output of the deep and cross network is provided as input to the machine learning model.

The advertisement system 228 determines, based on the output of the machine learning model with respect to the set of features, the predicted conversion rate for the first advertisement (block 708). For example, the predicted conversion rate corresponds to a post-click conversion rate.

In example embodiments, determining the predicted conversion rate is further based on performing inverse propensity weighting with respect to the plural sets of features corresponding to the plural second advertisements. For example, the predicted conversion rate is debiased at least in part by the inverse propensity weighting in conjunction with the multi-task learning.

Machine Architecture

Figure 8:
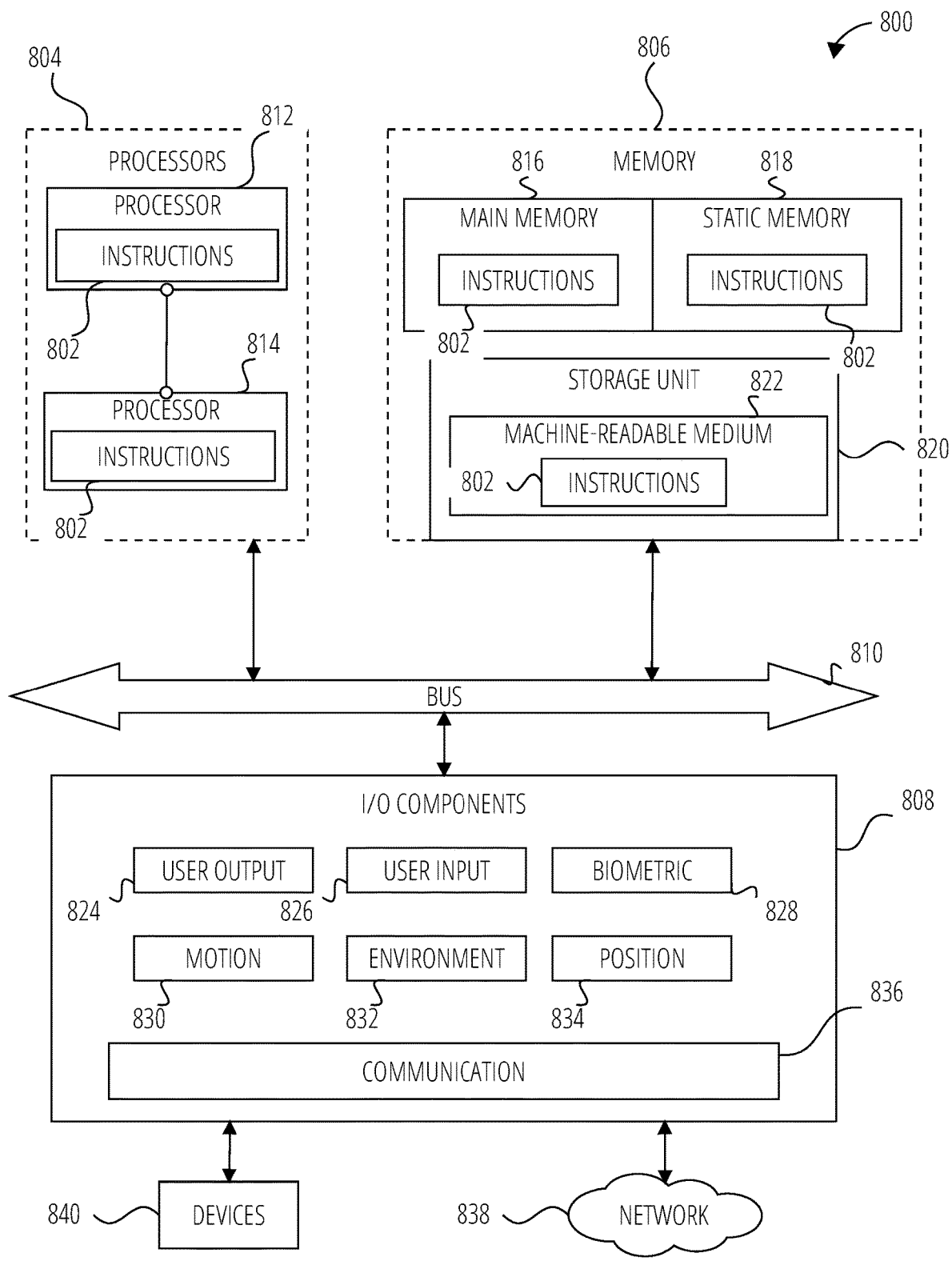
FIG. 8 is a diagrammatic representation of a machine in the form of a computer system within which a set of instructions may be executed to cause the machine to perform any one or more of the methodologies discussed herein, according to some examples.

FIG. 8 is a diagrammatic representation of the machine 800 within which instructions 802 (e.g., software, a program, an application, an applet, an app, or other executable code) for causing the machine 800 to perform any one or more of the methodologies discussed herein may be executed. For example, the instructions 802 may cause the machine 800 to execute any one or more of the methods described herein. The instructions 802 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 802, sequentially or otherwise, that specify actions to be taken by the machine 800. Further, while a single machine 800 is illustrated, the term "machine" shall also be taken to include a collection of machines that individually or jointly execute the instructions 802 to perform any one or more of the methodologies discussed herein. The machine 800, for example, may comprise the user system 102 or any one of multiple server devices forming part of the interaction server system 110. In some examples, the machine 800 may also comprise both client and server systems, with certain operations of a particular method or algorithm being performed on the server-side and with certain operations of the particular method or algorithm being performed on the client-side.

The machine 800 may include processors 804, memory 806, and input/output I/O components 808, which may be configured to communicate with each other via a bus 810. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 812 and a processor 814 that execute the instructions 802. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single-core, a single processor with multiple cores (e.g., a multi-core processor), multiple processors with a single core, multiple processors with multiples cores, or any combination thereof.

The memory 806 includes a main memory 816, a static memory 818, and a storage unit 820, both accessible to the processors 804 via the bus 810. The main memory 806, the static memory 818, and storage unit 820 store the instructions 802 embodying any one or more of the methodologies or functions described herein. The instructions 802 may also reside, completely or partially, within the main memory 816, within the static memory 818, within machine-readable medium 822 within the storage unit 820, within at least one of the processors 804 (e.g., within the processor's cache memory), or any suitable combination thereof, during execution thereof by the machine 800.

The I/O components 808 may include a wide variety of components to receive input, provide output, produce output, transmit information, exchange information, capture measurements, and so on. The specific I/O components 808 that are included in a particular machine will depend on the type of machine. For example, portable machines such as mobile phones may include a touch input device or other such input mechanisms, while a headless server machine will likely not include such a touch input device. It will be appreciated that the I/O components 808 may include many other components that are not shown in FIG. 8. In various examples, the I/O components 808 may include user output components 824 and user input components 826. The user output components 824 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 826 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 808 may include biometric components 828, motion components 830, environmental components 832, or position components 834, among a wide array of other components. For example, the biometric components 828 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 830 include acceleration sensor components (e.g., accelerometer), gravitation sensor components, rotation sensor components (e.g., gyroscope).

The environmental components 832 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 834 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 808 further include communication components 836 operable to couple the machine 800 to a network 838 or devices 840 via respective coupling or connections. For example, the communication components 836 may include a network interface component or another suitable device to interface with the network 838. In further examples, the communication components 836 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 840 may be another machine or any of a wide variety of peripheral devices (e.g., a peripheral device coupled via a USB).

Moreover, the communication components 836 may detect identifiers or include components operable to detect identifiers. For example, the communication components 836 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 836, such as location via Internet Protocol (IP) geolocation, location via Wi-Fi® signal triangulation, location via detecting an NFC beacon signal that may indicate a particular location, and so forth.

The various memories (e.g., main memory 816, static memory 818, and memory of the processors 804) and storage unit 820 may store one or more sets of instructions and data structures (e.g., software) embodying or used by any one or more of the methodologies or functions described herein. These instructions (e.g., the instructions 802), when executed by processors 804, cause various operations to implement the disclosed examples.

The instructions 802 may be transmitted or received over the network 838, using a transmission medium, via a network interface device (e.g., a network interface component included in the communication components 836) and using any one of several well-known transfer protocols (e.g., hypertext transfer protocol (HTTP)). Similarly, the instructions 802 may be transmitted or received using a transmission medium via a coupling (e.g., a peer-to-peer coupling) to the devices 840.

Software Architecture

Figure 9:
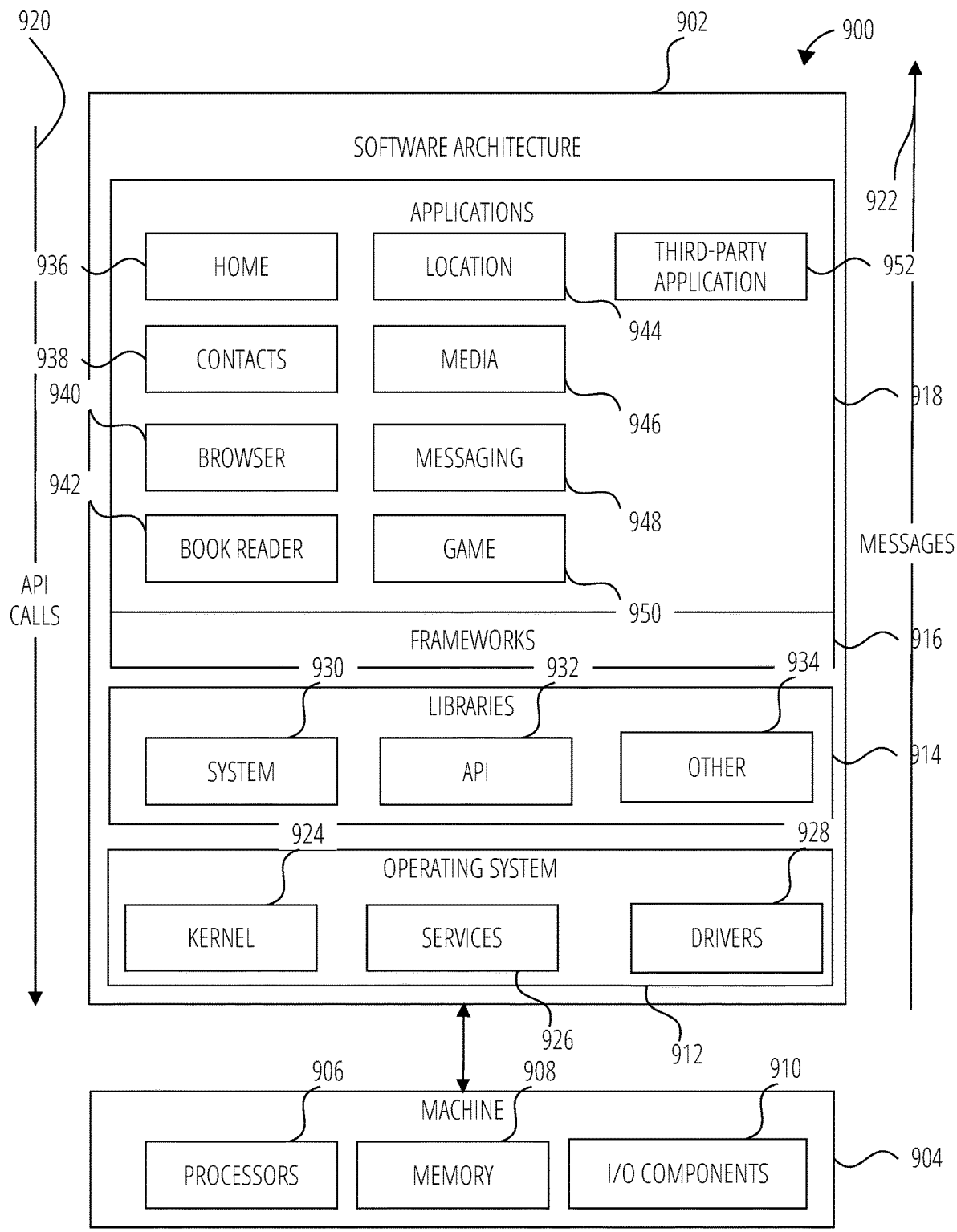
FIG. 9 is a block diagram showing a software architecture within which examples may be implemented.

FIG. 9 is a block diagram 900 illustrating a software architecture 902, which can be installed on any one or more of the devices described herein. The software architecture 902 is supported by hardware such as a machine 904 that includes processors 906, memory 908, and I/O components 910. In this example, the software architecture 902 can be conceptualized as a stack of layers, where each layer provides a particular functionality. The software architecture 902 includes layers such as an operating system 912, libraries 914, frameworks 916, and applications 918. Operationally, the applications 918 invoke API calls 920 through the software stack and receive messages 922 in response to the API calls 920.

The operating system 912 manages hardware resources and provides common services. The operating system 912 includes, for example, a kernel 924, services 926, and drivers 928. The kernel 924 acts as an abstraction layer between the hardware and the other software layers. For example, the kernel 924 provides memory management, processor management (e.g., scheduling), component management, networking, and security settings, among other functionalities. The services 926 can provide other common services for the other software layers. The drivers 928 are responsible for controlling or interfacing with the underlying hardware. For instance, the drivers 928 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 914 provide a common low-level infrastructure used by the applications 918. The libraries 914 can include system libraries 930 (e.g., C standard library) that provide functions such as memory allocation functions, string manipulation functions, mathematic functions, and the like. In addition, the libraries 914 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 914 can also include a wide variety of other libraries 934 to provide many other APIs to the applications 918.

The frameworks 916 provide a common high-level infrastructure that is used by the applications 918. For example, the frameworks 916 provide various graphical user interface (GUI) functions, high-level resource management, and high-level location services. The frameworks 916 can provide a broad spectrum of other APIs that can be used by the applications 918, some of which may be specific to a particular operating system or platform.

In an example, the applications 918 may include a home application 936, a contacts application 938, a browser application 940, a book reader application 942, a location application 944, a media application 946, a messaging application 948, a game application 950, and a broad assortment of other applications such as a third-party application 952. The applications 918 are programs that execute functions defined in the programs. Various programming languages can be employed to create one or more of the applications 918, structured in a variety of manners, such as object-oriented programming languages (e.g., Objective-C, Java, or C++) or procedural programming languages (e.g., C or assembly language). In a specific example, the third-party application 952 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 952 can invoke the API calls 920 provided by the operating system 912 to facilitate functionalities described herein.

Examples

Example 1 is a system comprising: at least one processor; at least one memory component storing instructions that, when executed by the at least one processor, cause the at least one processor to perform operations comprising: receiving, from an advertisement service, a bid to display a first advertisement at a computing device; determining, in response to receiving the bid, a set of features that relate to the first advertisement; providing the set of features to a machine learning model configured to output a predicted conversion rate for the first advertisement, the machine learning model having been trained based on multi-task learning using plural sets of features corresponding to plural second advertisements, the plural sets of features being associated with both click-through conversions and view-through conversions; and determining, based on the output of the machine learning model with respect to the set of features, the predicted conversion rate for the first advertisement.

In Example 2, the subject matter of Example 1 includes, wherein determining the predicted conversion rate is further based on performing inverse propensity weighting with respect to the plural sets of features corresponding to the plural second advertisements.

In Example 3, the subject matter of Example 2 includes, wherein the predicted conversion rate is debiased at least in part by the inverse propensity weighting in conjunction with the multi-task learning.

In Example 4, the subject matter of Examples 1-3 includes, wherein the multi-task learning is associated with tasks for pixel events, the pixel events comprising pixel page view, pixel sign up, pixel add to cart and pixel purchase.

In Example 5, the subject matter of Examples 1-4 includes, the operations further comprising: embedding a subset of the set of features that relate to the first advertisement; and concatenating, based on the embedding, the set of features for providing as input to the machine learning model.

In Example 6, the subject matter of Example 5 includes, the operations further comprising: providing the concatenated set of features to a deep and cross network, the deep and cross network comprising multiple cross layers configured to model explicit feature interactions, the deep and cross network further comprising a deep network configured to model implicit feature interactions, wherein output of the deep and cross network is provided as input to the machine learning model.

In Example 7, the subject matter of Examples 1-6 includes, wherein the plural sets of features are further associated with advertisement impressions for a preset time period, swiped advertisement identifiers for the preset time period and other advertisement identifiers.

In Example 8, the subject matter of Examples 1-7 includes, wherein the multi-task learning corresponds to a progressive layered extraction (PLE) model.

In Example 9, the subject matter of Examples 1-8 includes, wherein the predicted conversion rate corresponds to a post-click conversion rate.

Example 10 is a method comprising: receiving, from an advertisement service, a bid to display a first advertisement at a computing device; determining, in response to receiving the bid, a set of features that relate to the first advertisement; providing the set of features to a machine learning model configured to output a predicted conversion rate for the first advertisement, the machine learning model having been trained based on multi-task learning using plural sets of features corresponding to plural second advertisements, the plural sets of features being associated with both click-through conversions and view-through conversions; and determining, based on the output of the machine learning model with respect to the set of features, the predicted conversion rate for the first advertisement.

In Example 11, the subject matter of Example 10 includes, wherein determining the predicted conversion rate is further based on performing inverse propensity weighting with respect to the plural sets of features corresponding to the plural second advertisements.

In Example 12, the subject matter of Example 11 includes, wherein the predicted conversion rate is debiased at least in part by the inverse propensity weighting in conjunction with the multi-task learning.

In Example 13, the subject matter of Examples 10-12 includes, wherein the multi-task learning is associated with tasks for pixel events, the pixel events comprising pixel page view, pixel sign up, pixel add to cart and pixel purchase.

In Example 14, the subject matter of Examples 10-13 includes, embedding a subset of the set of features that relate to the first advertisement; and concatenating, based on the embedding, the set of features for providing as input to the machine learning model.

In Example 15, the subject matter of Example 14 includes, providing the concatenated set of features to a deep and cross network, the deep and cross network comprising multiple cross layers configured to model explicit feature interactions, the deep and cross network further comprising a deep network configured to model implicit feature interactions, wherein output of the deep and cross network is provided as input to the machine learning model.

In Example 16, the subject matter of Examples 10-15 includes, wherein the plural sets of features are further associated with advertisement impressions for a preset time period, swiped advertisement identifiers for the preset time period and other advertisement identifiers.

In Example 17, the subject matter of Examples 10-16 includes, wherein the multi-task learning corresponds to a progressive layered extraction (PLE) model.

In Example 18, the subject matter of Examples 10-17 includes, wherein the predicted conversion rate corresponds to a post-click conversion rate.

Example 19 is a non-transitory computer-readable storage medium storing instructions that, when executed by at least one processor, cause the at least one processor to perform operations comprising: receiving, from an advertisement service, a bid to display a first advertisement at a computing device; determining, in response to receiving the bid, a set of features that relate to the first advertisement; providing the set of features to a machine learning model configured to output a predicted conversion rate for the first advertisement, the machine learning model having been trained based on multi-task learning using plural sets of features corresponding to plural second advertisements, the plural sets of features being associated with both click-through conversions and view-through conversions; and determining, based on the output of the machine learning model with respect to the set of features, the predicted conversion rate for the first advertisement.

In Example 20, the subject matter of Example 19 includes, wherein determining the predicted conversion rate is further based on performing inverse propensity weighting with respect to the plural sets of features corresponding to the plural second advertisements.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an advertisement hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. A system comprising:
    at least one processor;
    at least one memory component storing instructions that, when executed by the at least one processor, cause the at least one processor to perform operations comprising:
        receiving, from an advertisement service, a bid to display a first advertisement at a computing device;
        determining, in response to receiving the bid, a set of features that relate to the first advertisement;
        providing the set of features to a machine learning model configured to output a predicted conversion rate for the first advertisement, the machine learning model having been trained based on multi-task learning using plural sets of features corresponding to plural second advertisements, the plural sets of features being associated with both click-through conversions and view-through conversions;

determining, based on the providing, model loss by performing inverse propensity weighting with respect to an auxiliary task that is not used to train a click-through-rate model; and determining the predicted conversion rate for the first advertisement, the predicted conversion rate being based at least in part on the model loss, wherein the model loss is calculated as follows:

$$\text{sum(loss)}=\text{loss}(ctc=1)*1/p\_swipe+\text{loss}(vtc)*1+\text{loss}(negative)*1,$$

with ctc representing click-through conversions, vtc representing view-through conversions, p_swipe representing a propensity score for the auxiliary task, and negative representing negative transfer to different tasks.

2. The system of claim 1, wherein determining the predicted conversion rate is further based on performing inverse propensity weighting with respect to the plural sets of features corresponding to the plural second advertisements.

3. The system of claim 2, wherein the predicted conversion rate is debiased at least in part by the inverse propensity weighting in conjunction with the multi-task learning.

4. The system of claim 1, wherein the multi-task learning is associated with tasks for pixel events, the pixel events comprising pixel page view, pixel sign up, pixel add to cart and pixel purchase.

5. The system of claim 1, the operations further comprising:
embedding a subset of the set of features that relate to the first advertisement; and
concatenating, based on the embedding, the set of features for providing as input to the machine learning model.

6. The system of claim 5, the operations further comprising:
providing the concatenated set of features to a deep and cross network, the deep and cross network comprising multiple cross layers configured to model explicit feature interactions, the deep and cross network further comprising a deep network configured to model implicit feature interactions,
wherein output of the deep and cross network is provided as input to the machine learning model.

7. The system of claim 1, wherein the plural sets of features are further associated with advertisement impressions for a preset time period, swiped advertisement identifiers for the preset time period and other advertisement identifiers.

8. The system of claim 1, wherein the multi-task learning corresponds to a progressive layered extraction (PLE) model.

9. The system of claim 1, wherein the predicted conversion rate corresponds to a post-click conversion rate.

10. A method comprising:
receiving, from an advertisement service, a bid to display a first advertisement at a computing device;
determining, in response to receiving the bid, a set of features that relate to the first advertisement;
providing the set of features to a machine learning model configured to output a predicted conversion rate for the first advertisement, the machine learning model having been trained based on multi-task learning using plural sets of features corresponding to plural second advertisements, the plural sets of features being associated with both click-through conversions and view-through conversions;
determining, based on the providing, model loss by performing inverse propensity weighting with respect to an auxiliary task that is not used to train a click-through-rate model; and
determining the predicted conversion rate for the first advertisement, the predicted conversion rate being based at least in part on the model loss,
wherein the model loss is calculated as follows:

$$\text{sum(loss)}=\text{loss}(ctc=1)*1/p\_swipe+\text{loss}(vtc)*1+\text{loss}(negative)*1,$$

with ctc representing click-through conversions, vtc representing view-through conversions, p_swipe representing a propensity score for the auxiliary task, and negative representing negative transfer to different tasks.

11. The method of claim 10, wherein determining the predicted conversion rate is further based on performing inverse propensity weighting with respect to the plural sets of features corresponding to the plural second advertisements.

12. The method of claim 11, wherein the predicted conversion rate is debiased at least in part by the inverse propensity weighting in conjunction with the multi-task learning.

13. The method of claim 10, wherein the multi-task learning is associated with tasks for pixel events, the pixel events comprising pixel page view, pixel sign up, pixel add to cart and pixel purchase.

14. The method of claim 10, further comprising:
embedding a subset of the set of features that relate to the first advertisement; and
concatenating, based on the embedding, the set of features for providing as input to the machine learning model.

15. The method of claim 14, further comprising:
providing the concatenated set of features to a deep and cross network, the deep and cross network comprising multiple cross layers configured to model explicit feature interactions, the deep and cross network further comprising a deep network configured to model implicit feature interactions,
wherein output of the deep and cross network is provided as input to the machine learning model.

16. The method of claim 10, wherein the plural sets of features are further associated with advertisement impressions for a preset time period, swiped advertisement identifiers for the preset time period and other advertisement identifiers.

17. The method of claim 10, wherein the multi-task learning corresponds to a progressive layered extraction (PLE) model.

18. The method of claim 10, wherein the predicted conversion rate corresponds to a post-click conversion rate.

19. A non-transitory computer-readable storage medium storing instructions that, when executed by at least one processor, cause the at least one processor to perform operations comprising:
receiving, from an advertisement service, a bid to display a first advertisement at a computing device;
determining, in response to receiving the bid, a set of features that relate to the first advertisement;
providing the set of features to a machine learning model configured to output a predicted conversion rate for the first advertisement, the machine learning model having been trained based on multi-task learning using plural sets of features corresponding to plural second advertisements, the plural sets of features being associated with both click-through conversions and view-through conversions;

determining, based on the providing, model loss by performing inverse propensity weighting with respect to an auxiliary task that is not used to train a click-through-rate model; and determining the predicted conversion rate for the first advertisement, the predicted conversion rate being based at least in part on the model loss, wherein the model loss is calculated as follows:

$$\text{sum(loss)} = \text{loss}(ctc=1)*1/p\_\text{swipe} + \text{loss}(vtc)*1 + \text{loss}(\text{negative})*1,$$

with ctc representing click-through conversions, vtc representing view-through conversions, p_swipe representing a propensity score for the auxiliary task, and negative representing negative transfer to different tasks.

20. The non-transitory computer-readable storage medium of claim 19, wherein determining the predicted conversion rate is further based on performing inverse propensity weighting with respect to the plural sets of features corresponding to the plural second advertisements.

* * * * *